United States Patent
Heikal et al.

(10) Patent No.: US 12,097,852 B2
(45) Date of Patent: *Sep. 24, 2024

(54) VIDEO ANALYTICS TRAFFIC MONITORING AND CONTROL

(71) Applicant: Charter Communications Operating, LLC, St. Louis, MO (US)

(72) Inventors: Hany A. Heikal, Aurora, CO (US); Hossam H. Hmimy, Aurora, CO (US)

(73) Assignee: Charter Communications Operating, LLC, St. Louis, MO (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/131,602

(22) Filed: Apr. 6, 2023

(65) Prior Publication Data

US 2023/0242112 A1 Aug. 3, 2023

Related U.S. Application Data (63) Continuation of application No. 16/929,193, filed on Jul. 15, 2020, now Pat. No. 11,623,639.

(51) Int. Cl.
*B60W 30/14* (2006.01)
*B60Q 9/00* (2006.01)
(Continued)

(52) U.S. Cl.
CPC .............. *B60W 30/143* (2013.01); *B60Q 9/00* (2013.01); *B60W 10/18* (2013.01);
(Continued)

(58) Field of Classification Search
CPC ..... B60Q 9/00; B60W 10/18; B60W 2420/42; B60W 2554/20; B60W 2554/80;
(Continued)

(56) References Cited

U.S. PATENT DOCUMENTS 9,545,922 B1 * 1/2017 Sim ..................... B60W 30/12
10,203,699 B1 * 2/2019 Kim ..................... H04W 12/08
(Continued)

FOREIGN PATENT DOCUMENTS

CA 3029124 A1 * 1/2018 ............. G01C 21/28
CN 104269054 A * 1/2015 ............... G08G 1/01
(Continued)

*Primary Examiner* — Babar Sarwar
(74) *Attorney, Agent, or Firm* — Armis IP Law, LLC (57) ABSTRACT

A controlled intersection employs video analytics to identify incoming vehicles coupled with autonomous driving capabilities in the vehicle to selectively provide intervention for collision avoidance. A camera image of an approaching vehicle is used to identify a range and speed, and to compute whether intervention is appropriate based on a detected distance and speed from the intersection. A vehicle approaching a stop signal (e.g. "red light") at an unsafe rate of speed triggers an invocation of on-board autonomous systems in the vehicle that provide appropriate warnings and ultimately, forced braking if warnings go unheeded. A registration system maintains a local grouping of vehicles in proximity to an intersection for minimizing latency in vehicle identification for commencing intervention. In this manner, on-board vehicle collision avoidance systems collaborate with complementary traffic control logic at a controlled intersection for preventing inadvertent or intentional disregard of a red signal.

20 Claims, 6 Drawing Sheets

(51) Int. Cl.
*B60W 10/18* (2012.01)
*B60W 30/18* (2012.01)
*G06V 10/75* (2022.01)
*G06V 20/54* (2022.01)
*G06V 20/62* (2022.01)
*G08G 1/017* (2006.01)
*G08G 1/052* (2006.01)

(52) U.S. Cl.
CPC ..... *B60W 30/18154* (2013.01); *G06V 10/751* (2022.01); *G06V 20/54* (2022.01); *G06V 20/63* (2022.01); *G08G 1/017* (2013.01); *G08G 1/052* (2013.01); *B60W 2420/403* (2013.01); *B60W 2554/20* (2020.02); *B60W 2554/80* (2020.02); *B60W 2555/60* (2020.02); *B60W 2556/45* (2020.02); *G06V 20/625* (2022.01); *G06V 2201/08* (2022.01)

(58) Field of Classification Search
CPC ......... B60W 2555/60; B60W 2556/45; B60W 30/143; B60W 30/18154; G06V 10/751; G06V 20/54; G06V 20/625; G06V 20/63; G06V 2201/08; G08G 1/0112; G08G 1/0116; G08G 1/0133; G08G 1/0145; G08G 1/017; G08G 1/04; G08G 1/052; G08G 1/056; G08G 1/08; G08G 1/081; G08G 1/096725; G08G 1/096741; G08G 1/096783
See application file for complete search history.

(56) References Cited

U.S. PATENT DOCUMENTS

| | | | | |
|---|---|---|---|---|
| 10,661,795 | B1 * | 5/2020 | Li | G08G 1/166 |
| 10,745,016 | B2 * | 8/2020 | Bae | B60W 40/04 |
| 2003/0112132 | A1 * | 6/2003 | Trajkovic | B60K 35/00 |
| | | | | 348/148 |
| 2008/0167821 | A1 * | 7/2008 | Breed | G08G 1/161 |
| | | | | 701/301 |
| 2014/0277901 | A1 * | 9/2014 | Ferguson | G08G 1/096758 |
| | | | | 701/27 |
| 2014/0309814 | A1 * | 10/2014 | Ricci | G06V 40/28 |
| | | | | 701/2 |
| 2016/0272201 | A1 * | 9/2016 | Kang | G08G 1/096741 |
| 2017/0267237 | A1 * | 9/2017 | Oyama | B60W 10/18 |
| 2018/0127001 | A1 * | 5/2018 | Ricci | B60W 60/0025 |
| 2018/0196427 | A1 * | 7/2018 | Majumdar | G05D 1/0061 |
| 2019/0202304 | A1 * | 7/2019 | Moghe | B60L 53/38 |
| 2019/0266629 | A1 * | 8/2019 | Bax | G06Q 40/08 |
| 2020/0019165 | A1 * | 1/2020 | Levandowski | B60W 40/02 |
| 2020/0079368 | A1 * | 3/2020 | Yamada | G08G 1/166 |
| 2020/0293796 | A1 * | 9/2020 | Sajjadi Mohammadabadi | |
| | | | | B60W 30/095 |
| 2021/0125076 | A1 * | 4/2021 | Zhang | G08G 1/0137 |
| 2021/0183244 | A1 * | 6/2021 | Malhan | B64F 1/362 |

FOREIGN PATENT DOCUMENTS

| | | | | |
|---|---|---|---|---|
| CN | 110874934 | A | * | 3/2020 |
| CN | 111260807 | A | * | 6/2020 |
| CN | 111832418 | A | * | 10/2020 |
| CN | 213070134 | U | * | 4/2021 |
| WO | WO-2015116950 | A1 | * | 8/2015 ............. B60K 31/00 |
| WO | WO-2017153979 | A1 | * | 9/2017 ............. G06K 9/00 |

* cited by examiner

VIDEO ANALYTICS TRAFFIC MONITORING AND CONTROL

RELATED APPLICATION

This application is a continuation application of earlier filed U.S. patent application Ser. No. 16/929,193 entitled "VIDEO ANALYTICS TRAFFIC MONITORING AND CONTROL", filed on Jul. 15, 2020, the entire teachings of which are incorporated herein by this reference.

BACKGROUND

Traffic control at vehicle intersections has always presented a safety issue to pedestrians and other vehicles travelling through the intersection. Traffic signals have traditionally provided a means of regulation by selectively displaying a visual indication of access to the roads that provide ingress to the intersection. Modern traffic intersections include timers to favor busy ingress points at appropriate times, and embedded wire loops and sensors in the roadway for detecting stopped traffic to mitigate waiting by an unopposed vehicle.

SUMMARY

A controlled intersection employs video analytics to identify incoming vehicles coupled with autonomous driving capabilities in the vehicle to selectively provide intervention for collision avoidance. A camera image of an approaching vehicle is used to identify a range and speed, and to compute whether intervention is appropriate based on a detected distance and speed from the intersection. A vehicle approaching a stop signal (e.g. "red light") at an unsafe rate of speed triggers an invocation of on-board autonomous systems in the vehicle that provide appropriate warnings and ultimately, forced braking if warnings go unheeded. A registration system maintains a local grouping of vehicles in proximity to an intersection for minimizing latency in vehicle identification for commencing intervention. In this manner, on-board vehicle collision avoidance systems collaborate with complementary traffic control logic at a controlled intersection for preventing inadvertent or intentional disregard of a red signal.

Configurations herein are based, in part, on the observation that controlled traffic intersections rely on a visual stop signal, or "red light," for alerting vehicle drivers of opposing traffic flow through and intersection. The traffic signal cycles around the ingress points into the intersection for metering traffic flow from each ingress point in a non-interfering path with the other ingress points. Unfortunately, conventional traffic control signals suffer from the shortcoming that the passive stop signal relies on driver volition to complement the action of stopping the vehicle when another ingress path (road) has the right-of-way. Drivers who are unaware of or unwilling to heed the stop signal circumvent the safe passage measures provided by the traffic signal, a practice commonly known as "running the red light." Accordingly, configurations herein substantially overcome the shortcomings of conventional passive traffic signals by providing an active intervention with an autonomous driving capability inherent in modern vehicles to safely slow or stop the vehicle at an appropriate distance from the intersection.

The disclosed approach closes a gap in modern automotive safety approaches between semi-autonomous vehicles and conventional signal-controlled intersections. Semi-autonomous vehicles can identify and intervene upon an identified collision threat, based on sensed object recognition, such as a stopped vehicle ahead. Signal controlled intersections ensure safe passage if driver perception and volition are attained for traffic signal recognition. The disclosed system triggers the semi-autonomous vehicle capability based on a distance and speed from the intersection, in contrast to object detection, and imposes an appropriate intervention when driver volition fails.

Configurations discussed below therefore provide a method of controlling a semi-autonomous vehicle, including propagating a local set of vehicle identities to an edge unit in communication with a traffic signal at a controlled intersection. The local set of vehicle identities is based on a subset of vehicles that are deemed proximate to the controlled intersection. An edge unit at the intersection is responsive to a video camera for computing, from an imaged detection of a vehicle corresponding to the set of vehicle identities, a distance of the vehicle approaching the controlled intersection. Identifying characteristics such as tag (license plate) number, color, make and model are derived from the imaged detection, and denote the control mechanism for invoking the autonomous system in the vehicle. The edge unit controls, based on a comparison of a speed threshold with the computed distance, the approaching vehicle in order to conform a speed of the vehicle with a predetermined speed corresponding to the speed threshold. This may take several intervention levels, from a merely audible warning to active brake engagement on a vehicle eminently close to a collision.

BRIEF DESCRIPTION OF THE DRAWINGS

The foregoing and other objects, features and advantages of the invention will be apparent from the following description of particular embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

Autonomous driver controls have been emerging in modern automobiles with increasing frequency and intervention capabilities. Early systems of several years ago provided only visual and/or audible warnings, such as "blind spot" detection and braking indicators triggered by a presence of vehicles to the side and forward positions, respectively. More recently, such systems have evolved into "collision avoidance" packages that include direct vehicle control through "active braking," which commences actual braking independently of the driver in response to detected vehicles, pedestrians or other objects forward of the vehicle.

Figure 1:
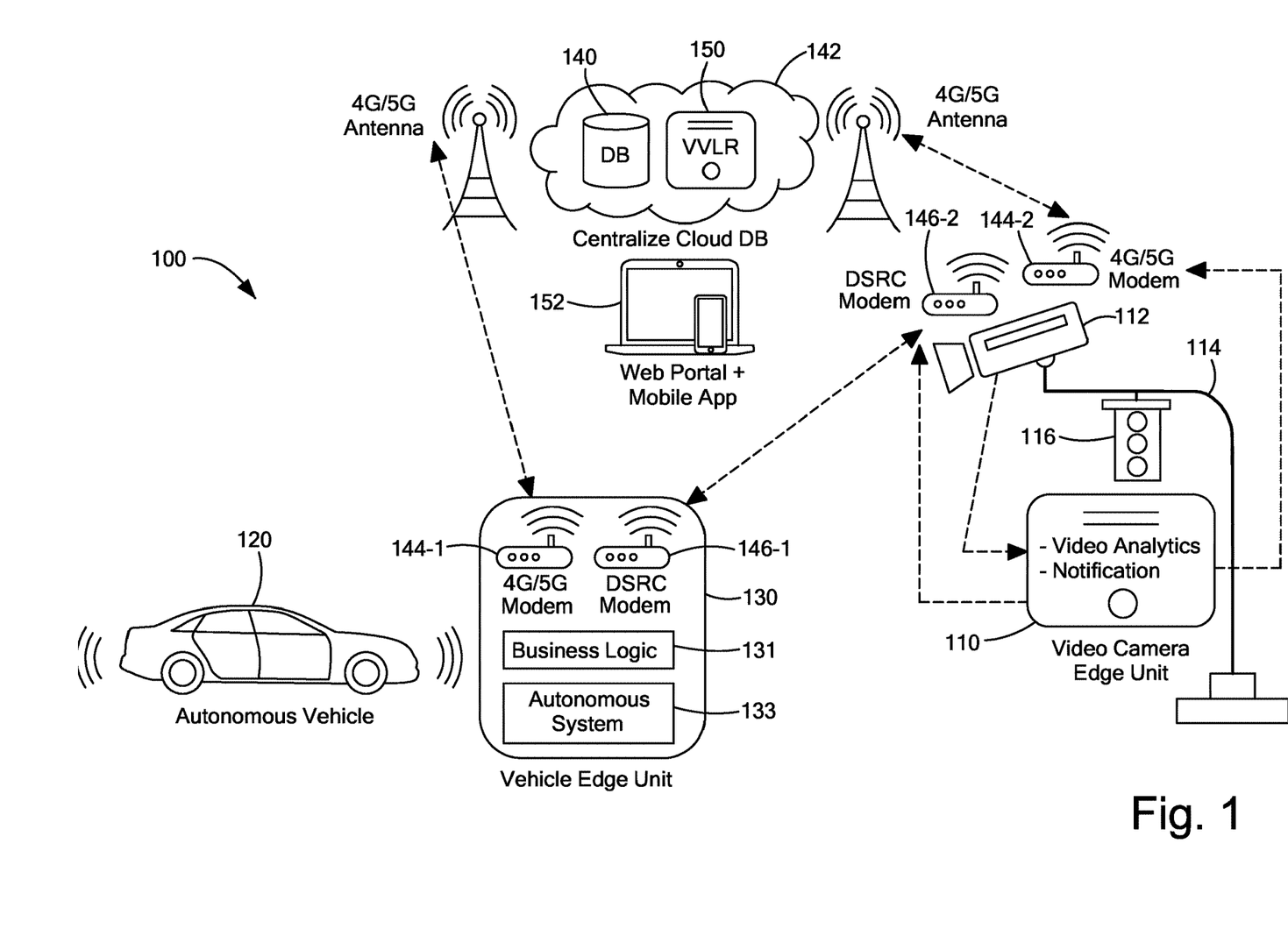
FIG. 1 is a context diagram showing a network based traffic monitoring and control system as disclosed herein.

FIG. 1 is a context diagram showing a network based traffic monitoring and control system as disclosed herein. Referring to FIG. 1, in a controlled intersection environment 100, a video camera edge unit 110 monitoring each intersection includes a video camera 112 secured to an existing traffic light structure 114 or similar mounting. The traffic light structure 114 also includes a traffic signal 116, visible to on an ingress path (road) by an approaching vehicle 120. A vehicle edge unit 130, typically part of a factory installed intra-vehicle control, has an ability to control vehicle braking, in addition to dashboard lights for less imperative intervention. A centralized registration database (DB) 140 resides in a cloud 142 store or similar globally accessible repository, and is in communication with both the vehicle edge unit 130 and the video camera edge unit 110 through wireless protocols such as 4G/5G or similar cellular data service available in the environment 100. Vehicle communication and control from the video camera edge unit 110 occurs via Dedicated Short Range Communications (DSRC), which is a one-way or two-way short-to-medium-range wireless communications capability known in the vehicle industry. DSRC was developed for data transmission in active safety applications to support collision avoidance systems in modern vehicles. Both the vehicle edge unit 130 and the video camera edge unit 110 employ a 4G/5G modem/transmitter 144-1, 144-2 respectively (144 generally) and a DSRC modem 146-1 . . . 146-2 (146 generally).

In the discussion that follows, dedicated processing occurs in several wireless-conversant devices disposed in the traffic control environment. A VVLR (Visitor Vehicle Location Register) 150 operates as a central authority in conjunction with the vehicle registration database 140. The VEU (Vehicle Edge Unit) 130 is typically defined by factory installed collision avoidance and/or telematics systems in the vehicle 120, but may be satisfied by aftermarket electronics as well. The VCEU (Video Camera Edge Unit) 110 is disposed on-site at the intersection, and typically connects with a video camera 112 facing each ingress path (e.g. roadway) entering the intersection. A web portal/mobile app 152 provides a conduit for vehicle registration by a user, and may be in conjunction with manufacturer supplied app based on the vehicle edge unit 130 and business logic 131 in the vehicle for data such as VIN number and DSRC connectivity information.

Figure 2:
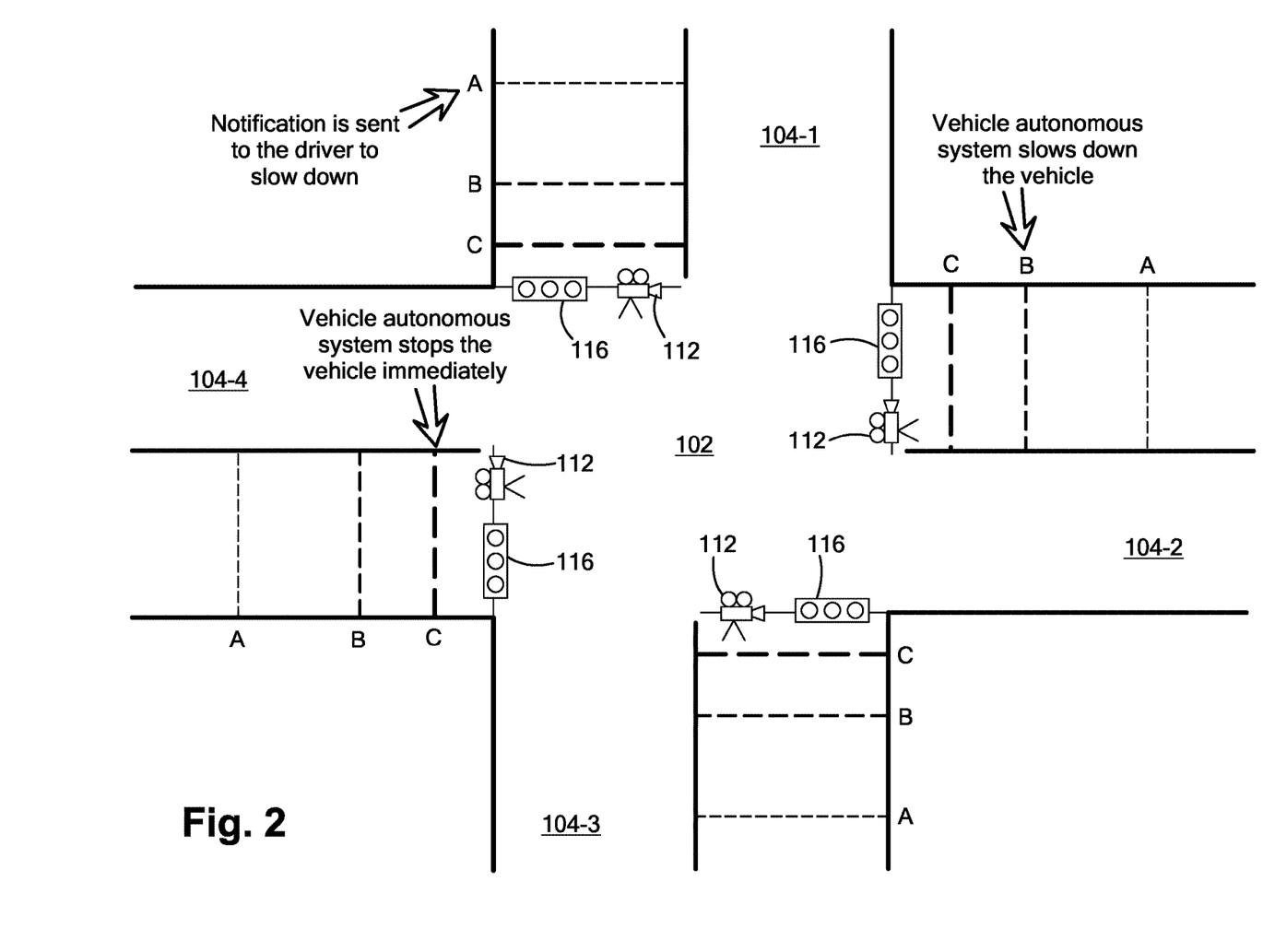
FIG. 2 is a plan view of a traffic intersection monitored by the system of FIG. 1.

FIG. 2 is a plan view of a traffic intersection monitored by the system of FIG. 1. Referring to FIGS. 1 and 2, a traffic intersection 102 in the environment 100 of FIG. 1. The intersection 102 includes a plurality of ingress paths 104-1 . . . 104-4 (104 generally), typically defined by roadways entering the intersection 102, however bike, jogging and pedestrian paths may also encompass an ingress path 104, if amenable to a layout of the intersection 102. Each ingress path has one or more distance markers A, B, C, typically based on a distance from the center of the intersection 102. Each ingress path 104 also has a dedicated camera 112 and traffic signal 116, with possibly multiple redundant lighted fixtures. Each distance marker has an associated speed, which if exceeded by an approaching vehicle, triggers the intervention based on the distance. A typical configuration controls an incoming vehicle 120 based on a comparison of a speed threshold with the computed distance based on a distance marker, and conforms a speed of the vehicle with a predetermined speed corresponding to the speed threshold.

In operation, when a registered vehicle 120 approaches, the camera edge unit geolocates an approaching vehicle from the set of vehicle identities stored locally at the VCEU 110. This identifies the approaching vehicle and a vector based on movement of the vehicle, such that the vector is indicative of an ingress path to the controlled intersection. The movement vector of the vehicle aligns with one of the ingress paths 104, which is also usually discernable from which camera received the image when the ingress paths are around 90° offset from each other, as in a typical 4-way intersection 102. Therefore, the VCEU 110 determines, based on which camera 112 of a plurality of cameras 112-N disposed at the controlled intersection 102 received the identified image, an ingress path to the intersection. Each ingress path has a set of distance markers with corresponding speed thresholds. Three distance markers A, B, C are shown on each ingress path in the example of FIG. 2, however any suitable number of distance markers/thresholds could be employed.

The VCEU 110 identifies the distance markers corresponding to the determined ingress path 104, and compares a speed of the vehicle with the plurality of distance markers, such that each distance marker is associated with a speed threshold and the ingress path to the controlled intersection.

The VCEU 110 may support any suitable number of cameras at an intersection. In a typical arrangement, the VCEU identifies an image of an approaching vehicle, and determines a direction of the approaching vehicle. The VCEU 110 computes, based on the direction, incoming ingress path 104 from a plurality of ingress paths to the controlled intersection, which is typically determined mostly by the camera receiving the approaching image. Upon attaining or passing each distance marker, the VCEU 110 indexes, based on the controlled intersection and the ingress path 104, a sequence of distance markers A, B, C and corresponding speed thresholds for comparison with vehicle speed.

In an example as used herein, if the speed threshold at marker A is exceeded, a visual and/or audible warning is provided to the driver, such as dashboard lights/sound. If speed persists above the corresponding speed threshold at marker B, the edge unit 110 now intervenes and begins applying braking action to actively slow the vehicle. Intervention takes several forms based on the distance. In the example arrangement, the intervention includes an alert signal, a braking signal or a stop signal, corresponding to decreasing distance markers A, B, C. Typically, the intervention is called for when the corresponding traffic signal on the ingress path is rendering a "red light" or "stop," however intervention may also be appropriate for excessive speed even with a "green light" displayed.

Finally, if distance marker C is attained at an above-threshold speed, full braking intervention is called for by the camera edge unit 110, and fulfilled by communication with the vehicle edge unit 130 via DSRC.

Deployed cameras 110 at controlled intersections continually process image frames of the respective ingress path to the intersection 102. A full configuration invokes capabilities as follows:

Video camera invokes video analytics capabilities to identify the vehicle's speed, direction, and License Plate Recognition.

Video camera sends/receives messages to the identified vehicle over DSRC protocol.

Video camera conversant in 4G or 5G technology.

The Vehicle supports the DSRC protocol as well as 4G or 5G LTE technologies.

The Vehicle shall have an autonomous or semi-autonomous driving capability.

The Visitor Vehicle Location Register (VVLR) 150 system includes a centralized cloud database as well as a cloud computing unit. The VVLR centralized cloud database shall store a list of all vehicles and cameras with the above capabilities. A VVLR cloud-computing unit will determine all the vehicles on the surrounding area for each video camera.

Many modern vehicles provide collision detection and avoidance systems that establish some level of autonomy, hence the characterization of semi-autonomous. While fully autonomous vehicles may also be employed with the present approach, such complete autonomy would likely be redundant with the claimed functionality, since the intent is to supplement driver volition when applicable; a fully autonomous vehicle does not require any driver volition.

Figure 3:
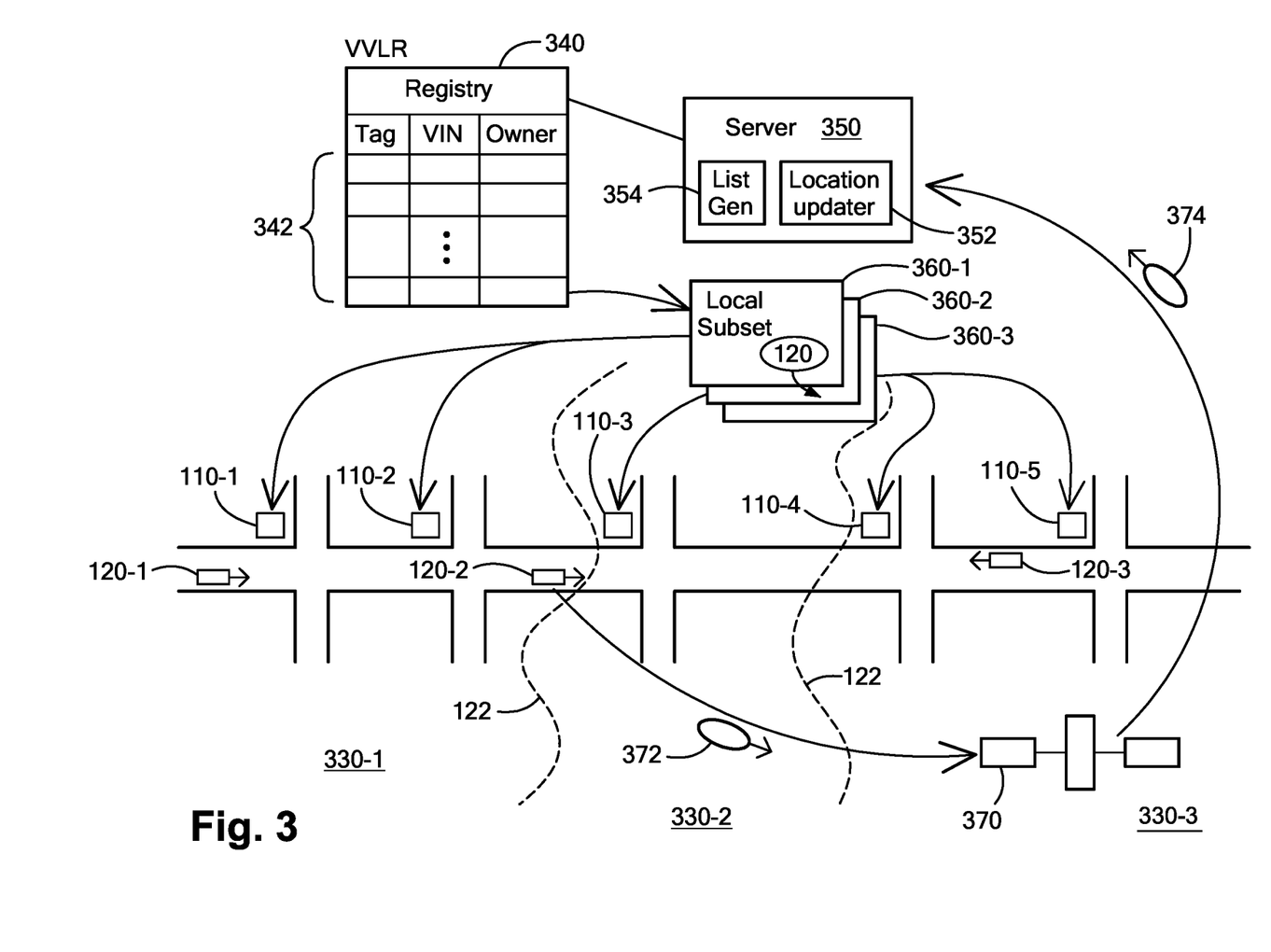
FIG. 3 is a data flow diagram during traffic flow monitoring of intersections as in FIG. 2.

FIG. 3 is a data flow diagram during traffic flow monitoring of intersections as in FIG. 2. Referring to FIGS. 1-3, the database 140 is defined by a repository 340 of semi-autonomous vehicles responsive to intervention from the camera edge unit 110. The repository includes entries 342 for storing an identity of each of a plurality of semi-autonomous vehicles, and includes at a minimum, for each vehicle, the license plate number (LPN), the vehicle identification number (VIN), and a consent to identify and propagate the location of the vehicle to the individual camera edge units 110. The central VVLR is driven by a traffic server 350 having list generator logic 354 used to identify a local set of vehicle identities at the edge unit 110. A subset of vehicles in the area of the edge unit 110 is based on an indication of a vehicle in a predetermined region around the controlled intersection corresponding to the edge unit 110. Any suitable granularity may be applied, such as a radius, zip code, or other suitable grouping. Whatever the granularity, the list generator 354 composes a list 360-1 . . . 360-3 (360 generally) of the vehicles on the surrounding area for each video camera. The video camera's surrounding area will be a circle or other designation and the radius of this circle or other area will be a configurable value. The VVLR 150 will continue updating the VCEU 110 with the vehicle list on a regular basis.

Accordingly, the edge units 110-1 . . . 110-5 (110 generally) remain updated by a respective list 360 sent from the server 350. In the example of FIG. 3, geographic regions 330-1 . . . 330-3 (330 generally) define the respective areas to which the lists 360 apply. Any suitable arrangement of geographic regions 330 may be employed. The lists 360 are used to propagate vehicle identities among a plurality of edge units, each disposed appurtenant to a controlled intersection 102. This maintains the subset of vehicles deemed proximate to the controlled intersection based on vehicles determined to be within the predetermined geographical region 330 around the controlled intersection. The local list allows the camera edge unit 110 to quickly identify, based on the video analysis, vehicles for which it need track and respond to if approaching too quickly. Each camera edge unit 110 may maintain an independent list 360 or set of local vehicles, or may share with adjacent intersections; granularity of the local vehicle set 360 may be tuned based on overall vehicle density and the distance between the camera edge units 110. Fast identification of approaching vehicles is paramount so that a large vehicle registry does not impede a response time.

Continuing to refer to FIGS. 1-3, the server 350 establishes and maintains the repository 340 of semi-autonomous vehicles responsive to intervention from the edge units 110. The server 350 stores an identity of each of a plurality of semi-autonomous vehicles in a respective entry 342 the repository 340 for dissemination to the edge units 110 when the corresponding vehicle 120 is in the area of the respective edge unit. For each camera edge unit 110, the server 350 populates the local set of vehicle identities at the edge unit based on an indication of a vehicle in a predetermined region 330-1 . . . 330-3 (330 generally) around the controlled intersection corresponding to the edge unit 110. As previously indicated, predetermined regions may be tuned to suit a granularity and density of each intersection 102, such as a simple radius, city block arrangement, municipal/state borders, or any suitable designation. Based on the predetermined regions 330, the server 350 propagates the vehicle identities from the entries 342 among a plurality of edge units, each of the edge units disposed appurtenant to a controlled intersection. As vehicles 120 travel, a location updater 352 maintains the subset of vehicles 360 deemed geographically proximate to the controlled intersection based on vehicles determined to be within a predetermined geographical region around the controlled intersection 102.

For example, GPS positions of each of the vehicles 120 is tracked by a satellite 370, vehicle 120-2 is approaching a demarcation 122 between regions 330-1 and 330-2. Satellite 370 receives a current position 372 from the vehicle 120-2, and relays a position update 374 to the server 350. This may be simply a GPS reading of the vehicle 120-2 location. The location updater 352 at the server 350 can designate the identity of vehicle 120-2 for removal from the local set 360-1 of the camera edge units 110 in region 330-1 and add it to the local set 360-2 for region 330-2. An entry for vehicle 120-2 in list 360-1 transitions to list 360-2. GPS based response need not involve actual satellite interfaces, as various telematics and vehicle systems are capable of providing GPS coordinates to the vehicle edge unit 130, which can then update the camera edge units 110 based on the transition of a vehicle 120 between the regions 330.

Figure 4:
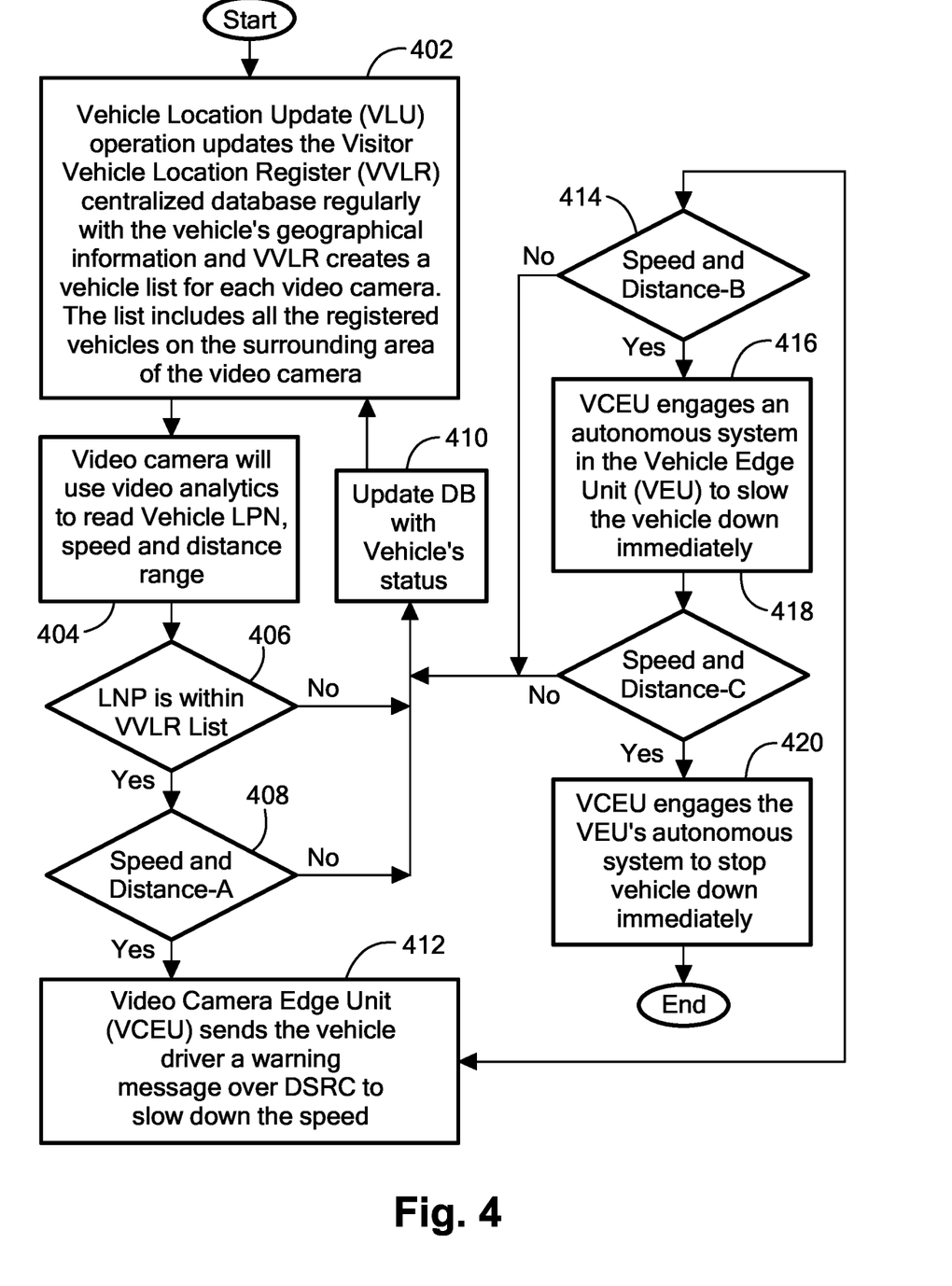
FIG. 4 is a flowchart of traffic monitoring and control as shown in FIGS. 1-3.

FIG. 4 is a flowchart of traffic monitoring and control as shown in FIGS. 1-3. Referring to FIGS. 1-4, in a typical expected implementation in a municipal environment, city officials will have access to the web portal 152 in order to add a list of cameras 112 and associated edge units 110 which have the above capabilities. Recall that generally, each intersection ideally has a dedicated camera edge unit 110 serving cameras 112 directed towards each incoming roadway, or ingress path 104, into the intersection 102. The geographical location information for each installed video camera will be part of the added information to the centralized cloud datastore defined by the repository 340.

Each time the vehicle is started/turned on, it will use the 4G/5G connection in order to automatically authenticate with the server/edge unit infrastructure. All the authenticated vehicles and video cameras will be authorized to communicate freely either through DSRC protocol or 4G/5G technologies, as outlined in FIG. 1.

In the example arrangement, each vehicle will use the 4G/5G modem to keep updating the VVLR centralized cloud database repository 340 with the geographical information by sending the latitude and longitude of the current location a Vehicle Location Update (VLU) message 374 for changing geographic regions when appropriate, as depicted at step 402. This maintains the local set 360 at each camera edge unit 110.

Vehicle analytics for detection generally includes identifying an image of an approaching vehicle, and determining, from the identified image, features of the approaching vehicle. A likely identifying feature includes alphanumeric characters from a vehicle plate tag, however other features such as color, make and model could be employed. The VCEU 110 compares the determined features to the local set of vehicle identities, and references, based on the comparison, a matching vehicle from the subset of vehicles 360 based on the comparison.

Video analytics for vehicle and license plate recognition as well as the identification of the vehicle's speed and direction are be executed on the video camera edge unit for faster response time and minimal latency. Latency is minimized from the local set of vehicles in the geographic region 330, thus avoiding possibly distant exchanges with the server 350 when a vehicle 120 is quickly closing the distance to the intersection 102.

Each video camera 112 is operable to read the license plate number, speed and distance range for all vehicles passing through a given intersection 102 by using the video camera analytic capabilities, as shown at step 404.

For each license plate number, the video camera will check against the vehicle list which is stored locally in the VCEU 110, as depicted at step 406. The server 350 propagates a local set or list 360 of vehicle identities to the edge unit 110, such that the edge unit is in communication with a traffic signal at a controlled intersection 102. The local set of vehicle identities is based on the subset of vehicles 360 deemed proximate to the controlled intersection. As a vehicle 120-1 . . . 120-3 (120 generally approaches, the camera edge unit 110 computes, from an imaged detection of the vehicle 120 corresponding to the set of vehicle identities, a distance of the vehicle approaching the controlled intersection 102.

Only vehicles registered with the VVLR 340 can be tracked and controlled. As a vehicle 120 comes within range of a camera 112, image analysis is invoked to identify the vehicle. The license plate number LPN is the most direct approach, however factors such as car make, model and color may be employed, particularly to narrow down candidate vehicles if, for example, the license plate has obscured characters.

In the example arrangement, controlling the registered vehicles includes determining a distance marker from the plurality of distance markers corresponding to a current location of the vehicle as the vehicle approaches the intersection. At each distance marker (A, B, C), the vehicle edge unit 110 may determine that the speed of the vehicle exceeds the speed threshold associated with the determined distance marker; and applies an intervention to the vehicle based on the distance marker.

Once the vehicle 120 is confirmed as registered, the camera edge unit 110 determines a distance and a speed of the approaching vehicle 120. Having identified a registered vehicle 120, the camera edge unit 110 commences tracking a distance of the approaching vehicle from the controlled intersection, and performs the comparison of the speed threshold and vehicle speed when a distance of the vehicle from the controlled intersection meets one of the distance markers of the plurality of the distance markers associated with the respective speed thresholds. The camera edge unit 110 monitors the speed, and at the distance markers (A, B, C) corresponding to each of the plurality of speed thresholds, and controls the vehicle speed if a speed of the vehicle exceeds the speed threshold when the vehicle reaches the distance marker associated with the speed threshold.

At step 408, a check is performed to determine if the vehicle speed exceeds a certain speed limit for distance marker A. If so, the VCEU 110 will send a notification message via DSRC protocol or 4G/5G technology to inform the vehicle driver to slow down immediately since the vehicle's speed is above speed for marker A, as shown at step 412. This may, but need not coincide with the legally posted speed limit. It may also be coupled with the traffic signal 116 rendering a red signal. The Vehicle Edge Unit (VEU) 130 receives the message and displays it on the vehicle's dashboard, reflective windshield or other visual/audible alerting mechanism.

If the vehicle LPN is not recognized at steps 406 or 408, the repository 340 may be updated with this information, but no active intervention occurs, as disclosed at step 410.

As the vehicle approaches distance marker B, a further check is performed at step 414. If the vehicle speed exceeds a certain speed limit within distance marker B, the VCEU will send another message via DSRC protocol or 4G/5G technology. The Vehicle Edge Unit (VEU) receives the message and displays it on the vehicle's dashboard and starts engaging the autonomous system 133 to slow down the vehicle's speed, as depicted at step 416.

A final check is performed at step 418 to determine if the vehicle speed exceeds a certain speed limit within distance marker C. The VCEU 10 will send another message via DSRC or protocol or 4G/5G links, and the Vehicle Edge Unit (VEU) will receive the message and displays it on the vehicle's dashboard and starts engaging the autonomous driving system to stop the vehicle immediately, as depicted at step 420. The final marker is deemed to be equivalent to a "panic stop" and exert full measures in the autonomous vehicle's stopping capability.

If the check at steps 408, 414 or 418 indicates that the vehicle has slowed below the corresponding speed threshold, the repository 340 is updated with the vehicle status, as depicted at step 410.

Figure 5:
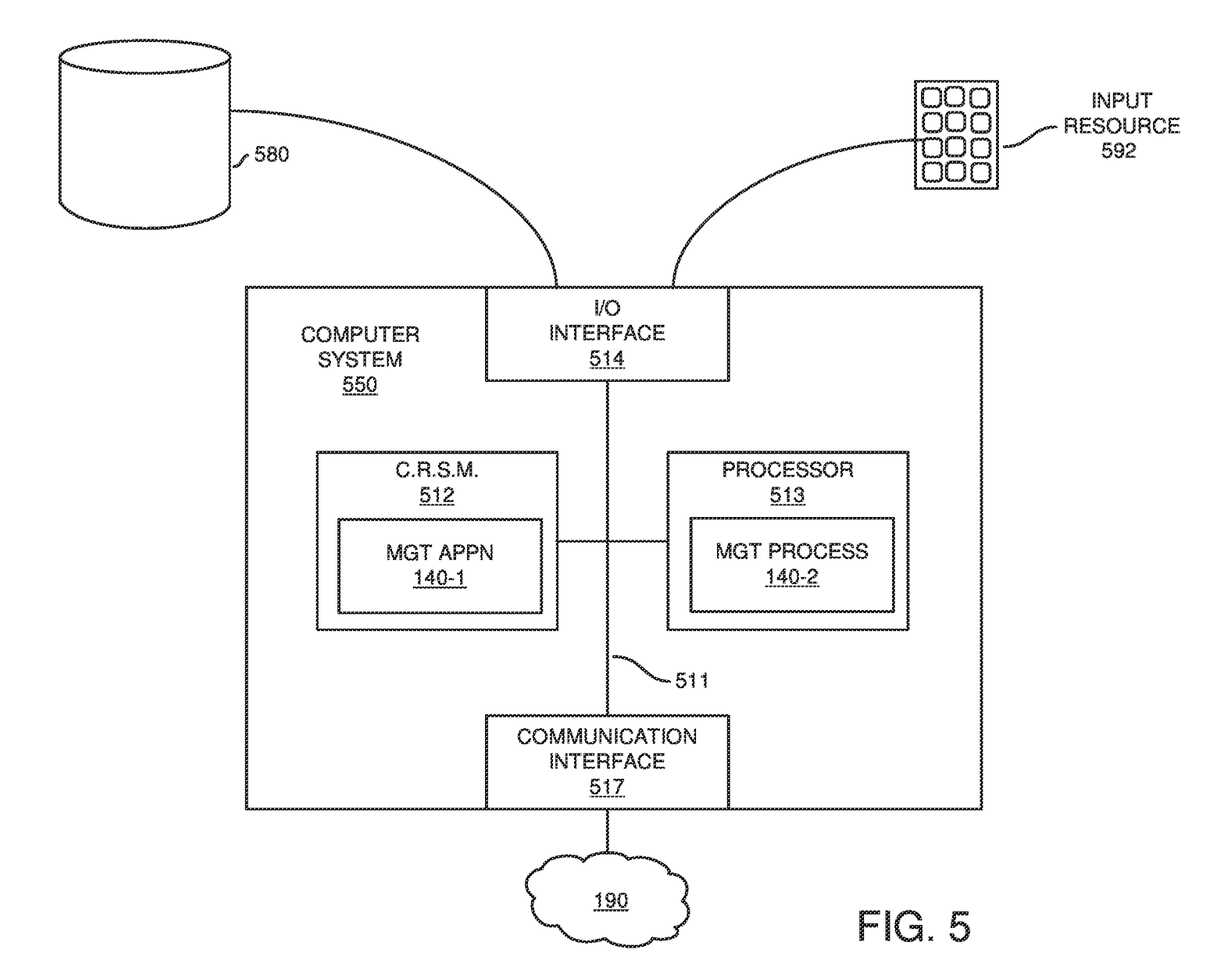
FIG. 5 is an example diagram illustrating example computer architecture operable to execute one or more operations according to embodiments herein.

FIG. 5 is an example block diagram of a computer system for implementing any of the operations as previously discussed according to embodiments herein.

Any of the resources as discussed herein (management system and corresponding components, resources, etc.) can be configured to include computer processor hardware, analog/digital circuitry, and/or corresponding executable instructions to carry out the different operations as discussed herein.

As shown, computer system 550 of the present example includes an interconnect 511 that couples computer readable storage media 512 such as a non-transitory type of media (i.e., any type of hardware storage medium) in which digital information can be stored and retrieved, a processor 513, I/O interface 514, and a communications interface 517.

I/O interface(s) 514 supports connectivity to repository 580 and input resource 592.

Computer readable storage medium 512 can be any hardware storage device such as memory, optical storage, hard drive, floppy disk, etc. In one embodiment, the computer readable storage medium 512 stores instructions and/or data.

As shown, computer readable storage media 512 can be encoded with management application 140-1 (e.g., including instructions) to carry out any of the operations as discussed herein.

During operation of one embodiment, processor 513 accesses computer readable storage media 512 via the use of interconnect 511 in order to launch, run, execute, interpret or otherwise perform the instructions in management application 140-1 stored on computer readable storage medium 512. Execution of the management application 140-1 produces management process 140-2 to carry out any of the operations and/or processes as discussed herein.

Those skilled in the art will understand that the computer system 550 can include other processes and/or software and hardware components, such as an operating system that controls allocation and use of hardware resources to management application 140-1.

In accordance with different embodiments, note that computer system may reside in any of various types of devices, including, but not limited to, a mobile computer, a personal computer system, a wireless device, a wireless access point, a base station, phone device, desktop computer, laptop, notebook, netbook computer, mainframe computer system, handheld computer, workstation, network computer, application server, storage device, a consumer electronics device such as a camera, camcorder, set top box, mobile device, video game console, handheld video game device, a peripheral device such as a switch, modem, router, set-top box, content management device, handheld remote control device, any type of computing or electronic device, etc. The computer system 550 may reside at any location or can be included in any suitable resource in any network environment to implement functionality as discussed herein.

Functionality supported by the different resources will now be discussed via flowcharts in FIG. 6. Note that the steps in the flowcharts below can be executed in any suitable order.

Figure 6:
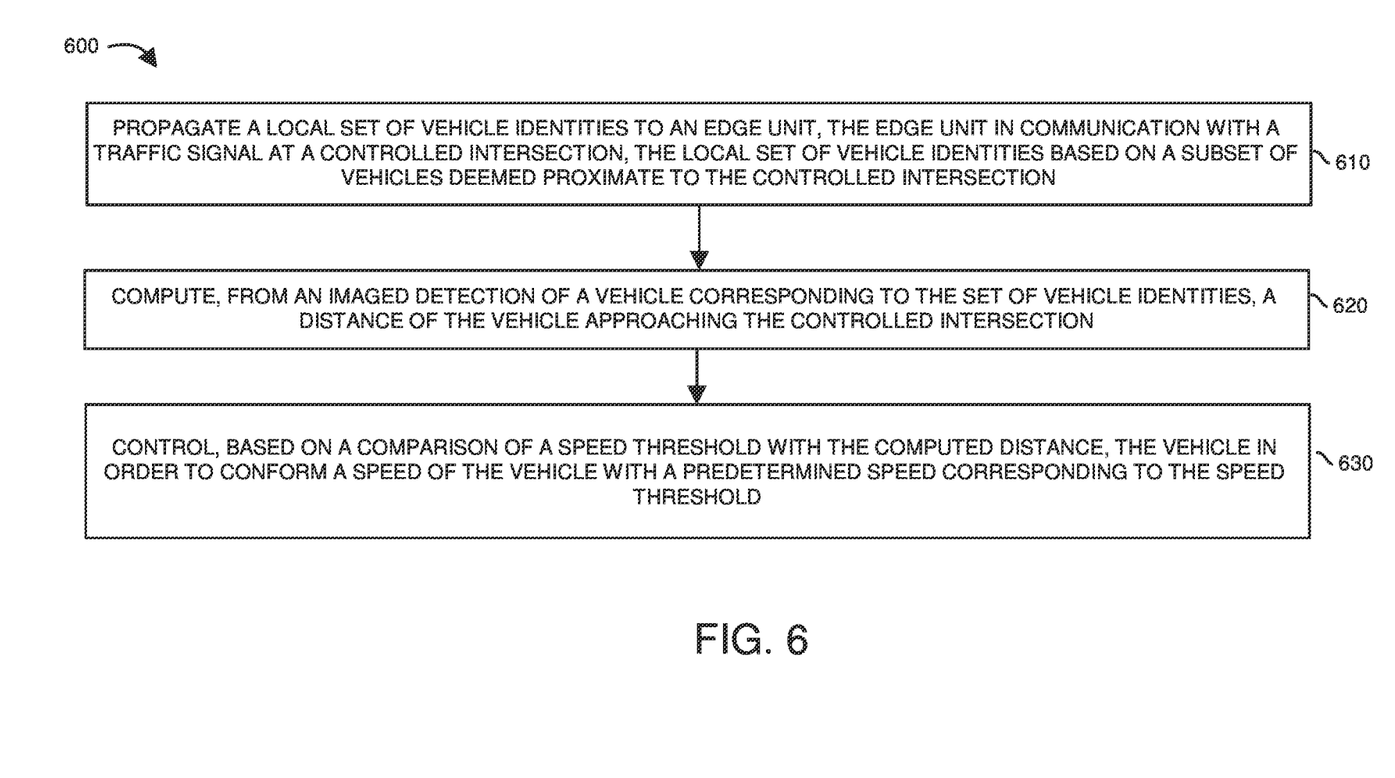
FIG. 6 is an example diagram illustrating a method according to embodiments herein.

FIG. 6 is a flowchart 600 illustrating an example method according to embodiments herein. Note that there will be some overlap with respect to concepts as discussed above.

In processing operation 610, the management system as described herein propagates a local set of vehicle identities to an edge unit, the edge unit in communication with a traffic signal at a controlled intersection, the local set of vehicle identities based on a subset of vehicles deemed proximate to the controlled intersection.

In processing operation 620, the management system as described herein computes, from an imaged detection of a vehicle corresponding to the set of vehicle identities, a distance of the vehicle approaching the controlled intersection.

In processing operation 630, the management system controls, based on a comparison of a speed threshold with the computed distance, the vehicle in order to conform a speed of the vehicle with a predetermined speed corresponding to the speed threshold.

Those skilled in the art should readily appreciate that electronic logic and instructions as disclosed herein are open to implementation in many forms, including but not limited to a) information permanently stored on non-writeable storage media such as ROM devices, b) information alterably stored on writeable non-transitory storage media such as floppy disks, magnetic tapes, CDs, RAM devices, and other magnetic and optical media, or c) information conveyed to a computer through communication media, as in an electronic network such as the Internet or telephone modem lines. The operations and methods may be implemented in a software executable object or as a set of encoded instructions for execution by a processor responsive to the instructions. Alternatively, the operations and methods disclosed herein may be embodied in whole or in part using hardware components, such as Application Specific Integrated Circuits (ASICs), Field Programmable Gate Arrays (FPGAs), state machines, controllers or other hardware components or devices, or a combination of hardware, software, and firmware components.

While the system and methods defined herein have been particularly shown and described with references to embodiments thereof, it will be understood by those skilled in the art that various changes in form and details may be made therein without departing from the scope of the invention encompassed by the appended claims.

What is claimed is:

1. A method of controlling a semi-autonomous vehicle, comprising:
    propagating a local set of vehicle identities to an edge unit, the edge unit in communication with a traffic signal at a controlled intersection, the local set of vehicle identities based on a subset of vehicles deemed proximate to the controlled intersection;
    geolocating an approaching vehicle from the set of vehicle identities for identifying the approaching vehicle;
    computing, based on a fixed camera gathering an imaged detection of the geolocated vehicle, a vector indicative of a distance, speed and an ingress path of the vehicle approaching the controlled intersection; and
    controlling, based on a comparison of a speed threshold with the computed distance, the vehicle in order to conform a speed of the vehicle with a predetermined speed corresponding to the speed threshold, controlling further comprising:
    determining that the speed of the vehicle exceeds the speed threshold; and
    applying an intervention to the vehicle.

2. The method of claim 1 further comprising identifying a distance marker corresponding to each of a plurality of speed thresholds, further comprising controlling the vehicle speed if a speed of the vehicle exceeds the speed threshold when the vehicle reaches the distance marker associated with the speed threshold and the traffic signal is issuing a stop signal.

3. The method of claim 2 further comprising:
    tracking a distance of the approaching vehicle from the controlled intersection, and
    performing the comparison of the speed threshold when a distance of the vehicle from the controlled intersection meets one of the distance markers of the plurality of the distance markers associated with the respective speed thresholds.

4. The method of claim 1 wherein controlling further comprises:
    determining a speed and an identity of the vehicle from the imaged detection.

5. The method of claim 1, wherein the intervention includes an alert signal, a braking signal and a stop signal.

6. The method of claim 1, further comparing the speed of the vehicle, the speed derived from the vector, with a plurality of distance markers, each distance marker of the plurality of distance markers associated with a speed threshold and the ingress path to the controlled intersection.

7. The method of claim 1 further comprising:
    identifying an image of an approaching vehicle;
    determining a direction of the approaching vehicle;
    computing, based on the direction, an ingress path from a plurality of ingress paths to the controlled intersection; and
    indexing, based on the controlled intersection and the ingress paths, a sequence of distance markers and corresponding speed thresholds for comparison with vehicle speed.

8. The method of claim 7 wherein imaged detection further comprises:
    determining, based on which camera of a plurality of cameras disposed at the controlled intersection received the identified image, an ingress path to the intersection; and comparing the speed to a plurality of distance markers corresponding to the determined ingress path.

9. The method of claim 7 further comprising:
identifying an image of an approaching vehicle;
determining, from the identified image, features of the approaching vehicle;
comparing the determined features to the local set of vehicle identities; and
referencing, based on the comparison, a matching vehicle from the subset of vehicles based on the comparison.

10. The method of claim 9 wherein the features include alphanumeric characters from a vehicle plate tag.

11. The method of claim 1 further comprising:
establishing a repository of semi-autonomous vehicles, the semi-autonomous vehicles responsive to intervention from the edge unit;
storing an identity of each of a plurality of semi-autonomous vehicles in the repository; and
populating the local set of vehicle identities at the edge unit based on an indication of a vehicle in a predetermined region around the controlled intersection corresponding to the edge unit.

12. The method of claim 11 further comprising:
propagating vehicle identities among a plurality of edge units, each of the edge units disposed appurtenant to a controlled intersection; and
maintaining the subset of vehicles deemed proximate to the controlled intersection based on vehicles determined to be within a predetermined geographical region around the controlled intersection.

13. An edge unit device for controlling a semi-autonomous vehicle, comprising:
an interface to a vehicle registration repository for receiving a local set of vehicle identities;
an interface to a traffic signal at a controlled intersection, the local set of vehicle identities based on a subset of vehicles deemed proximate to the controlled intersection;
a geolocation signal for geolocating an approaching vehicle from the set of vehicle identities for identifying the approaching vehicle;
a video analytics processor for computing, based on a fixed camera gathering an imaged detection of the vehicle, a vector indicative of a distance and a speed of the vehicle approaching the controlled intersection;
an interface to one or more cameras for transmitting the image for vehicle detection; and
processor logic for controlling, based on a comparison of a speed threshold with the computed distance, the vehicle in order to conform the speed of the vehicle with a predetermined speed corresponding to the speed threshold.

14. The device of claim 13 wherein the processor logic is configured for identifying a distance marker corresponding to each of the plurality of speed thresholds, and further configured to send a message for controlling the vehicle speed if a speed of the vehicle exceeds the speed threshold when the vehicle reaches the distance marker associated with the speed threshold.

15. The device of claim 14 further wherein the video analytics processor is configured to track a distance of the approaching vehicle from the controlled intersection, and performing the comparison of the speed threshold when a distance of the vehicle from the controlled intersection meets one of the distance markers of the plurality of the distance markers associated with the respective speed thresholds.

16. The device of claim 13 wherein the local set of vehicle identities at the edge unit is based on an indication of a vehicle in a predetermined region around the controlled intersection corresponding to the edge unit.

17. The device of claim 13 wherein the processor logic is configured to:
determine a distance marker from the plurality of distance markers corresponding to a current location of the vehicle;
determine that the speed of the vehicle exceeds the speed threshold associated with the determined distance marker; and
apply an intervention to the vehicle based on the distance marker.

18. The device of claim 17 further comprising a DSRC Dedicated Short Range Communications modem configured for transmitting a message triggering the intervention in the vehicle, the intervention including at least one of an alert signal, a braking signal and a stop signal.

19. The device of claim 13 wherein the processor logic is configured to compare the speed, the speed derived from the vector, with a plurality of distance markers, each distance marker of the plurality of distance markers associated with a speed threshold and the ingress path to the controlled intersection.

20. A computer program embodying program code on a non-transitory medium that, when executed by a processor, performs steps for implementing a method of controlling a semi-autonomous vehicle, the method comprising:
propagating a local set of vehicle identities to an edge unit, the edge unit in communication with a traffic signal at a controlled intersection, the local set of vehicle identities based on a subset of vehicles deemed proximate to the controlled intersection;
geolocating an approaching vehicle from the set of vehicle identities for identifying the approaching vehicle;
computing, based on a fixed camera gathering an imaged detection of the geolocated vehicle, a vector indicative of a distance, speed and an ingress path of the vehicle approaching the controlled intersection; and
controlling, based on a comparison of a speed threshold with the computed distance, the vehicle in order to conform a speed of the vehicle with a predetermined speed corresponding to the speed threshold, controlling further comprising:
determining that the speed of the vehicle exceeds the speed threshold; and
applying an intervention to the vehicle.

* * * * *